March 1, 1927. 1,619,065
S. FORMAN
TEAPOT OR COFFEEPOT
Filed Sept. 17, 1924
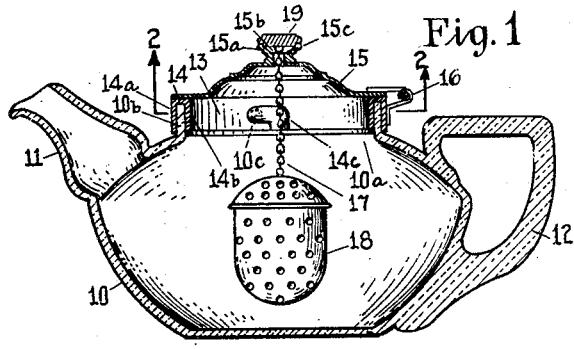
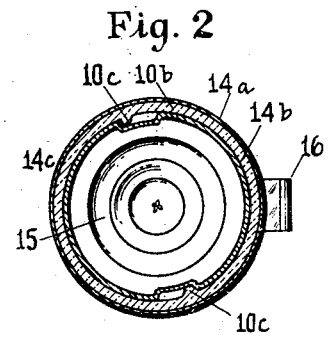
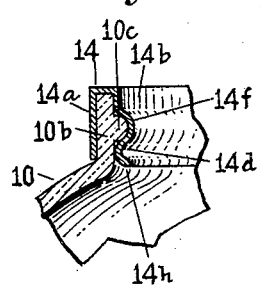
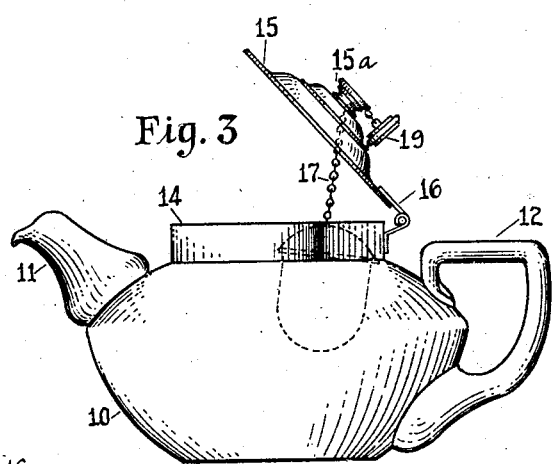
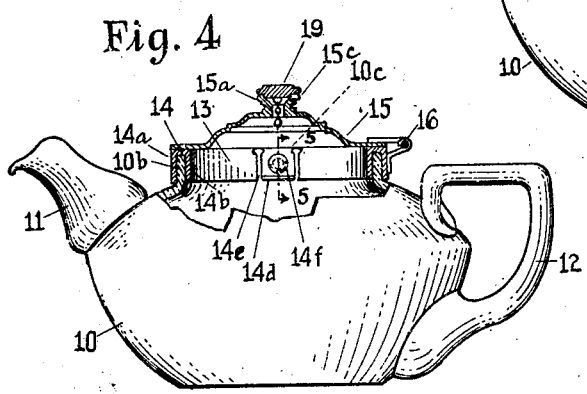
INVENTOR
SOLOMON FORMAN
BY
ATTORNEY Patented Mar. 1, 1927.

1,619,065

UNITED STATES PATENT OFFICE.

SOLOMON FORMAN, OF NEW YORK, N. Y.

TEAPOT OR COFFEEPOT.

Application filed September 17, 1924. Serial No. 738,122.

This invention relates to tea-pots, coffee-pots and the like. More particularly, it is directed to a sanitary tea-pot of improved construction having a body portion made of glass, porcelain or the like material and fitted with a metallic removable closure member having a hinged cover on which a tea ball is hung.

An object of the invention is to provide an improved device of the character described in which the metallic closure member is releasably mounted on the body portion to permit the easy removal thereof so that the parts may be conveniently and thoroughly cleansed in a manner best suited for each.

Another object of the invention is to provide a device of the character described which is formed of few and simple parts, which is simple and neat in construction, inexpensive to manufacture, and highly desirable from a sanitary standpoint.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention, Fig. 1 is a vertical cross-sectional view through a tea-pot embodying the invention showing the interior construction;

Fig. 2 is a sectional view taken on line 2—2 in Fig. 1;

Fig. 3 is a front elevational view of the tea-pot shown in Fig. 1 with the hinged lid partially open;

Fig. 4 is an elevational view of the tea-pot with parts broken away showing a modified form of interlocking means between the body portion and the cover member; and Fig. 5 is a fragmentary sectional view taken on line 5—5 in Fig. 4.

Referring in detail to the drawing, 10 denotes the body portion of a tea pot which may be made of glass, porcelain or the like material, and has formed integral therewith a spout 11 and a suitable handle 12. The body portion 10 has a top opening $10^a$ bounded by an upstanding wall or neck portion $10^b$ on which is fitted, over the opening $10^a$, a removable closure or cover member 13.

The member 13 is preferably made of metal suitably ornamented and finished and may comprise a base ring 14 of substantial U-shaped cross-section having inner and outer wall portions $14^a$, $14^b$ and a lid 15 secured to said ring 14 by means of a hinge 16 as shown in Figs. 1 and 3. The lid 15 is preferably formed with a knob portion $15^a$ positioned to extend centrally up from its top side thereof, and an opening $15^b$ is provided through said knob portion $15^a$ to permit the passage of a chain 17 on the lower end of which a tea ball 18 is hung. To support the upper end of the chain 17, there is a button 19 which seats on knob portion $15^a$ and a slot $15^c$ may be provided in the latter for adjustably anchoring the chain 17 therein so as to vary the height of the tea ball with respect to the lid 15.

Where the closure member for tea pots, coffee pots and the like vessels having glass body portions is fitted loosely in the vessel, difficulty has been experienced in that in the use of the vessel the closure member often drops out of the vessel with resulting breakage. On the other hand, where the closure member has been securely fastened to the body portion of the vessel as by cementing the base ring to the vessel, this has resulted in a construction which renders the vessel less easily cleansable, since the portions adjacent the cemented joints are not accessible, and since the glass and metallic parts require different cleansing processes. This is particularly the case where the metal closure member is ornamented and finished with a gilt coating or a silver plating.

A dominant feature of the invention resides in the provision of releasable fastening means between the metallic closure member 13 and the body portion 10 to overcome the above described cleansing difficulties.

As seen from Figs. 1 and 2, said means may comprise a bayonet joint fastening and comprises a pair of spaced teat-projections $10^c$ formed integral with the interior side of the neck portion $10^b$, diametrically positioned to extend into the opening $10^a$, and correspondingly spaced L-shaped recesses $14^c$ depressed in the inner wall portion $14^a$ of the base ring 14 for receiving said projections $10^c$. The outer wall portion $14^a$ of the ring 14 is spaced from the inner wall portion $14^b$ so as to snugly embrace the neck portion 10$^b$, and shield the fastening means from view, and is adapted to have ornamentations formed on the exposed surface thereof.

It is apparent that a tea pot constructed in accordance with the invention as above described and illustrated provides a sanitary dispensing receptacle that facilitates cleansing since the closure member 13 may be quickly and easily removed from its normal interlocked position on body portion 10 by simply giving the member 13 a slight turn and separating the engaging projections 10$^c$ from the recesses 14$^c$.

In Figs. 4 and 5 is shown a modified form of interlocking means between the body portion 10 and closure member 13. In this modified form, each L-shaped recess 14$^c$ in the inner wall portions 14$^a$ shown in Figs. 1 and 2 is replaced by a tongue 14$^d$ formed in the wall portion 14$^b$ by providing a pair of transversely extending spaced parallel slots 14$^e$, the tongue being provided with a depression 14$^f$ which is arranged to fit over the teat-projections 10$^c$. It is obvious that with the latter construction the cover member 13 may be removed from its normally assembled position by firmly holding the body portion 10 and exerting a pull on the ring 14. To assemble the two parts, the tongue 14$^d$ is brought in alignment with the teat-projections 10$^c$ and the parts pressed into engagement. The free end portions 14$^h$ of the tongue 14$^d$ may be bent inwardly as shown in Fig. 5 to serve as guides to facilitate the engagement of the fastening means.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. In a device of the character described, the combination of a vitreous dispensing container having a top opening, a demountable metallic closure member for said opening, said member comprising a base ring of U-shaped cross-section adapted to engage the rim about said opening and a cover hinged to said ring, said cover having a vertically perforated knob centrally mounted thereon, and a tea ball having a chain upwardly extending through said knob, said knob having a slot for engaging said chain lengthwise thereof for adjustably hanging the tea ball from said cover in the container.

2. In a device of the character described, the combination of a vitreous dispensing container having a top opening, a demountable metallic closure member for said opening, said member comprising a base ring of U-shaped cross-section adapted to engage the rim about said opening and a cover hinged to said ring, said cover having a vertically perforated knob centrally mounted thereon, and a tea ball having a chain upwardly extending said knob, said knob having a slot for engaging said chain lengthwise thereof for adjustably hanging the tea ball from said cover in the container.

3. A sanitary tea pot comprising a vitreous body portion having a top opening with an upstanding wall or neck forming the rim of the top opening, a demountable closure member for said opening, said member comprising a metallic base ring of U-shaped cross-section arranged to embrace said neck, a cover adapted to support a tea ball in said body portion hinged to said ring, and means for releasably securing said member to said body portion, said means comprising teat-projections formed on the inner surface of said neck for interlockingly engaging with portions of the inner wall of said ring.

4. A sanitary tea pot comprising a body portion having a top opening, a demountable closure member for said opening; said member comprising a base ring of U-shaped cross-section fitted over the rim of said opening, relatively small portions on one side of said ring adapted to releasably engage the rim of the opening to positively prevent the accidental separation of the member and body portion and a cover hinged to said ring.

5. A sanitary tea pot comprising a body portion having a top opening, the rim of the latter forming an upstanding neck, a demountable closure member for said opening, said member including a base ring of U-shaped cross section fitted over the neck, relatively small portions of the inner wall of said ring being adapted to releasably engage said neck to positively prevent the accidental separation of the member and body portion.

In testimony whereof I affix my signature.

SOLOMON FORMAN.